United States Patent
Pardal et al.

(10) Patent No.: US 12,545,823 B2
(45) Date of Patent: Feb. 10, 2026

(54) LAMINATION ADHESIVE FOR STERILISATION

(71) Applicant: BOSTIK SA, Colombes (FR)

(72) Inventors: Francis Pardal, Venette (FR); David Penet, Venette (FR)

(73) Assignee: BOSTIK SA, Colombes (FR)

( * ) Notice: Subject to any disclaimer, the term of this patent is extended or adjusted under 35 U.S.C. 154(b) by 952 days.

(21) Appl. No.: 17/604,794

(22) PCT Filed: Apr. 23, 2020

(86) PCT No.: PCT/FR2020/050690
§ 371 (c)(1),
(2) Date: Oct. 19, 2021

(87) PCT Pub. No.: WO2020/217023
PCT Pub. Date: Oct. 29, 2020

(65) Prior Publication Data
US 2022/0204825 A1 Jun. 30, 2022

(30) Foreign Application Priority Data

Apr. 26, 2019 (FR) ...................... 1904454

(51) Int. Cl.
*C09J 175/06* (2006.01)
*C08G 18/10* (2006.01)
*C08G 18/42* (2006.01)
*C08J 7/04* (2020.01)

(52) U.S. Cl.
CPC ............ *C09J 175/06* (2013.01); *C08G 18/10* (2013.01); *C08G 18/4216* (2013.01); *C08G 18/425* (2013.01); *C08J 7/042* (2013.01)

(58) Field of Classification Search
CPC ..... C09J 175/06; C09J 2475/00; C08G 18/10; C08G 18/4216; C08G 18/425; C08J 7/042; C09D 175/06
See application file for complete search history.

(56) References Cited

U.S. PATENT DOCUMENTS

| 5,478,897 A | 12/1995 | Sasano et al. |
| 2019/0004336 A1* | 1/2019 | Mori ................. G02B 5/30 |

FOREIGN PATENT DOCUMENTS

| EP | 1283232 A2 | 2/2003 |
| EP | 1985679 A1 | 10/2008 |
| EP | 3101044 A1 | 12/2016 |
| WO | 2015093583 A1 | 6/2015 |
| WO | 2015095583 A1 | 6/2015 |

OTHER PUBLICATIONS

ISA/EP; International Search Report and Written Opinion for International Patent Application No. PCT/FR2020/050690 dated Sep. 3, 2020, 10 pages.

* cited by examiner

*Primary Examiner* — Scott R. Walshon
(74) *Attorney, Agent, or Firm* — Rimon P.C.; Allyn B. Elliott

(57) ABSTRACT

A solvent-based two-component polyurethane-type adhesive composition comprises an —OH component and an —NCO component. The —OH component comprises an amorphous prepolymer including two —OH end groups, with a number-average molar mass $M_n$ of 8000 to 12,000 g and is chosen from: a) a copolyester (A1) obtained by a polycondensation reaction of at least one aliphatic diol (i) with at least one aromatic diacid (ii) and at least one aliphatic diacid (iii); and b) a polyurethane (A2) obtained by a polyaddition reaction between an aliphatic diisocyanate compound and an amorphous copolyester diol with a number-average molecular weight $M_n$ ranging from 4000 to 11 500 g/mol. The —NCO component comprises a compound (B1) including three —NCO end groups, obtained by the reaction of meta-xylylene diisocyanate (m-XDI) with a triol, said compound (B1) being alone or as a mixture with a compound (B2) derived from an aliphatic diisocyanate.

15 Claims, No Drawings

LAMINATION ADHESIVE FOR STERILISATION

CROSS-REFERENCE TO RELATED APPLICATIONS

This application is a U.S. National Stage application of International Patent Application No. PCT/FR2020/050690, filed on Apr. 23, 2020, which claims the benefit of French Patent Application No. 1904454, filed on Apr. 26, 2019.

A subject matter of the present invention is a solvent-based two-component polyurethane-type adhesive composition, which is suitable for the lamination of thin layers of materials, in particular polymeric and/or metallic materials. It also relates to a multilayer film comprising at least two thin layers of said materials bonded together by said cross-linked adhesive composition. Finally, it relates to the use of said film for the manufacture of flexible packagings for processed foodstuffs, more particularly intended for sterilization.

Flexible (or supple) packagings intended in particular for the packaging of processed foodstuffs generally consist of several thin layers (in the form of sheets or films), the thickness of which is between 5 and 150 μm, which consist of different materials, such as paper, a metal (for example aluminum) or also by thermoplastic polymers. These thin layers are bonded together by adhesive bonding, and the corresponding multilayer film, the thickness of which can vary from 20 to 400 μm, makes it possible to combine the properties of the different individual layers of material (also described as "supports") and to thus offer the consumer a set of characteristics suited to the final flexible packaging, such as, for example:

its visual appearance (in particular that of the printed elements presenting the information concerning the packaged product intended for the consumer, or also its transparency), a barrier effect to light or to atmospheric moisture or to gases, in particular to oxygen, contact with food without risk of toxicity or of modification to the organoleptic properties of the packaged foodstuffs, chemical resistance for certain products, such as ketchup, and appropriate thermal resistance.

Such thermal resistance is understood to mean the maintenance of the cohesion of the multilayer film when it is exposed to high temperatures, and in particular the absence of separation between the thin layers bonded by adhesive bonding which constitute it. Such a separation is generally denoted by the term "delamination".

This is because this thermal resistance is necessary during the forming of the multilayer film for the manufacture of the final packaging. This forming generally comprises a heat-sealing stage, during which said film is subjected for a few seconds to a temperature of between 120 and 250° C. and to a pressure of a few bars. The latter technique is also used for closing the packaging around the processed foodstuff.

This thermal resistance is also required for the multilayer films which are intended for the sterilization treatments of the processed foodstuffs packaged in the packaging. This is because such a treatment exposes the multilayer film to a temperature of between 100 and 135° C. for a period of time generally greater than that of the heat-sealing, which can range up to an hour.

The various layers of materials of which the multilayer film is composed are combined or assembled by laminating during industrial lamination processes. These processes employ adhesives and items of equipment (or machines) which are designed for this purpose and which operate continuously with generally very high line speeds, of the order of several hundred meters per minute. The multilayer film thus obtained is itself often denoted by the term "laminate".

These lamination processes first of all comprise a stage of coating the adhesive over a first film of material, which consists of the deposition of a continuous layer of adhesive with a controlled thickness generally of less than 10 μm, corresponding to an amount of adhesive (or grammage) generally not exceeding 10 g/m². This coating stage is followed by a stage of laminating a second film of material, which is identical to or different from the first, consisting of the application under pressure of this second film to the first film covered with the layer of adhesive.

The multilayer films are thus finally obtained in very large width format and are generally put in a proper state by winding, in the form of wide reels from 1 m to 1.50 m in diameter having, like the film which they store, a width of up to 2 m. These wide reels can be stored and transported, for the purpose of their use:

either directly by the manufacturers of the processed foodstuff, for the purpose of putting their foodstuff in a proper state, or by converters (or laminators).

In both cases, the film is cut to reduce its width and shaped to manufacture sachets, themselves intended for the packaging of a product, for example a processed foodstuff.

Solvent-comprising two-component polyurethane-type lamination adhesives are widely used as adhesive for the manufacture of multilayer systems intended for the field of flexible packaging. The employment of said solvent-based adhesives in the lamination process necessitates a stage of evaporation of the organic solvent. This stage is carried out before the laminating stage by passing through an oven the first film covered with adhesive following the coating stage.

The solvent-comprising two-component polyurethane-type lamination adhesives are supplied to the laminator in the form of two compositions (or components):

one (known as —NCO component) comprising chemical entities carrying isocyanate —NCO end groups, and the other (known as —OH component) comprising chemical entities carrying hydroxyl —OH end groups.

As regards a solvent-comprising adhesive, these two compositions are organic solutions of these chemical entities.

The mixing of these two organic solutions is carried out at ambient temperature by the operator of the laminating machine prior to its start-up, which makes possible the correct functioning of the latter, by virtue of an appropriate viscosity obtained, if appropriate, by addition of solvent.

On conclusion of the stage of coating of the mixture thus obtained on the $1^{st}$ thin layer and of the stage of laminating of the $2^{nd}$ layer, the isocyanate groups of the —NCO component react with the hydroxyl groups of the —OH component, according to a reaction referred to as crosslinking, to form a polyurethane which exists in the form of a three-dimensional network comprising urethane groups, providing the cohesion of the adhesive seal between the two thin laminated layers. Solvent-comprising two-component polyurethane-type lamination adhesives are particularly suitable for multilayer films which are capable of withstanding sterilization treatments.

This cohesion must be provided in part starting from the laminating stage, at a level sufficient for the two-layer film constituted by the two supports to be strong enough to withstand the mechanical stresses, in particular of shearing, applied by the laminating machine. These stresses result in particular from the very high running speed of the two-layer film and of the multiple cylinders (or rollers) with which it is in contact, in particular for its guidance and the regulation of its tension. The resistance of such a two-layer film to said stresses is particularly critical when said film is employed in the laminating machine as intermediate for the manufacture of a three-layer film, by coating of a new layer of adhesive on one of the faces of said two-layer film, followed by laminating of a $3^{rd}$ film of material on said face. Likewise, the resistance of a three-layer film to these mechanical stresses is also critical when said film is employed in the laminating machine as intermediate for the manufacture of a four-layer film.

The ability of the solvent-comprising two-component PU-type adhesives to provide, starting from the coating and laminating stage for the purpose of the production of a two-layer, three-layer or four-layer film, this initial cohesion is denoted in the art by the term "initial tack".

The period of time required to completely conclude the crosslinking reaction, and thus to provide the level of cohesion required for the purpose of the use of the multilayer film in the manufacture of flexible packagings, is known as "crosslinking time". It is very high, generally of the order of three to seven days, and is obtained, in practice, by storing the reels of multilayer film either at ambient temperature or at a higher temperature, which results in disadvantages for the organization of the industrial production of the laminators, related to the need to have available appropriate storage spaces.

The multilayer films manufactured according to such a process using solvent-comprising two-component polyurethane-based lamination adhesives are generally well suited to the manufacture of supple flexible packagings resistant to sterilization due to their good level of cohesion.

Such lamination adhesives are known, in particular from the application EP 1 283 232 of Mitsui Chemicals.

The chemical entities present in the —OH component are generally polymeric or non-polymeric chemical compounds, sometimes of natural origin (such as castor oil), which generally include polymers of polyether polyol and/or polyester polyol type, with a molar mass often of between 400 and 4000 g/mol.

The chemical entities present in the —NCO component are generally polymeric chemical compounds which are called prepolymers since they are precursors of the constituent final crosslinked polyurethane of the adhesive seal. These prepolymers comprising —NCO end groups are generally themselves polyurethanes produced by the polyaddition reaction of a molar excess of a diisocyanate monomer, which is generally aromatic, such as diphenylmethane diisocyanate (MDI) or toluene diisocyanate (TDI), with polyether polyols and/or polyester polyols.

In point of fact, for reasons which stem from the specificity of this polyaddition reaction and from the presence of the molar excess of the diisocyanate, a certain amount of unreacted diisocyanate monomer remains in the —NCO component thus obtained. These residual amounts of ("free") aromatic diisocyanate monomers of low molecular weight are capable of migrating through the multilayer film, after the employment of the two-component adhesive, and thus through the final flexible packaging. Thus, said compounds are capable of forming by hydrolysis, on contact with the water or the moisture present in particular in packaged foods, primary aromatic amines (PAAs), which are regarded as being very harmful to human health and the environment.

It is an aim of the present invention to provide a solvent-comprising two-component polyurethane which can be employed in a multilayer film without the risk of subsequent formation of primary aromatic amines.

Another aim of the invention is to provide a solvent-comprising two-component polyurethane which offers manufacturers in the lamination industry, during the manufacture of said film, a suitable initial tack.

Another aim of the invention is to provide a solvent-comprising two-component polyurethane which offers manufacturers in the lamination industry, during the manufacture of said film, an appropriate crosslinking time at ambient temperature, preferably of less than or equal to five days, more preferentially still of less than or equal to two days.

Another aim of the invention is to provide a solvent-comprising two-component polyurethane-type lamination adhesive which results, after lamination, and in particular after lamination of metallic or metallized supports, in a multilayer film being obtained which exhibits the required cohesion properties.

Another aim of the invention is to provide a solvent-based two-component polyurethane resulting in multilayer films, in particular films comprising a metallic or metallized support, the cohesion of which is maintained after the sterilization treatments applied to the packagings by the manufacturers of processed foodstuffs.

It has now been found that these aims can be achieved, in all or in part, by the adhesive composition described below.

A subject matter of the present invention is thus a solvent-based two-component polyurethane-type adhesive composition, comprising an —OH component and an —NCO component, such that:

the —OH component is a composition (A) comprising an amorphous prepolymer which includes two —OH end groups, the number-average molar mass $M_n$ of which ranges from 8000 to 12 000 g (corresponding to an NOH ranging from 9.4 to 14 mg KOH/g) and which is chosen from:
  a copolyester (A1) obtained by a polycondensation reaction:
    of at least one aliphatic diol (i); with
    at least one aromatic diacid (ii) chosen from terephthalic acid, isophthalic acid, phthalic acid and one of their diester or anhydride derivatives; and
    at least one aliphatic diacid (iii) or one of its diester or anhydride derivatives; and
  a polyurethane (A2) obtained by a polyaddition reaction between an aliphatic diisocyanate compound (A2.P1) and an amorphous copolyester diol (A2.P2), the number-average molecular weight $M_n$ of which ranges from 4000 to 11 500 g/mol, said copolyester being obtained by the polycondensation reaction as defined above for (A1); and the component —NCO is a composition (B) comprising a compound (B1) which includes three —NCO end groups, and which is obtained by the reaction of meta-xylylene diisocyanate (m-XDI) with a triol, said compound (B1) being:
  either the only compound comprised in (B) including three —NCO end groups;
  or else a mixture with another compound (B2) including three —NCO end groups, (B2) being derived from an aliphatic diisocyanate and the content of (B1) in said mixture being at least 40% by weight, based on the total weight of said mixture.

The solvent-based two-component adhesive composition as defined above advantageously makes it possible to obtain, on conclusion of a crosslinking time at ambient temperature of less than or equal to two days, a multilayer film which is devoid of any risk of subsequent formation of PAAs harmful to human health. In fact, the diisocyanate monomers used, if appropriate, in the preparation of the —NCO and —OH components which constitute it are aliphatic monomers.

Said adhesive composition additionally makes it possible, advantageously, to obtain a two-layer film which exhibits an initial tack of greater than 2 N/15 mm, making possible the in-line production of a three-layer or four-layer film, without intermediate storage, respectively, of the two-layer or three-layer films.

Finally, the multilayer films obtained by means of said adhesive composition exhibit excellent cohesion properties, in particular when one of the supports of said film is a metallized support, such as, for example, an aluminum film. These cohesive properties are moreover also excellent after heat treatment for the purpose of sterilization.

The achieving of these properties for the multilayer film is accompanied by easy use of the corresponding two-component adhesive composition, whether it concerns easy introduction, by means of a pump, of the —NCO and —OH components into the laminating machine, due to their viscosity properties, or whether it concerns also the use, in the laminating machine itself, of the composition resulting from the mixing of said components, here again due to an appropriate viscosity profile, for said composition.

Composition (A) (—OH Component):

The composition (A) comprises an amorphous prepolymer including two —OH end groups (also denoted diol), which can be linear or branched, and is chosen from the copolyester (A1) and the polyurethane (A2).

Amorphous Copolyester Diol (A1):

According to one embodiment, the amorphous prepolymer included in the composition (A) is the amorphous copolyester diol (A1).

The amorphous copolyester diol (A1) can be linear or branched and has a number average molar mass (also known as $M_n$) ranging from 8000 to 12 000 g/mol, which corresponds to an NOH ranging from 9.4 to 14 mg KOH/g.

The number-average molar mass $M_n$ is measured by size exclusion chromatography (or SEC), which is also denoted by the term "gel permeation chromatography" (or GPC). The calibration carried out is usually a PEG (PolyEthylene Glycol) or PS (PolyStyrene), preferably PS, calibration.

The hydroxyl number (denoted NOH) of the amorphous linear copolyester diol (A1), and more generally of a polyol, (denoted NOH), represents the number of hydroxyl functional groups per gram of polyol and is expressed in the form of the equivalent number of milligrams of potassium hydroxide (KOH) used in the assaying of the hydroxyl functional groups, determined by titrimetry, according to the standard ISO 14900:2017. The NOH is related to the number-average molar mass $M_n$ by the relationship:

$$NOH=(56.1\times 2\times 1000)/M_n$$

The amorphous copolyester diol (A1) is obtained by a polycondensation reaction:
of at least one aliphatic diol (i), with
at least one aromatic diacid (ii) chosen from terephthalic acid, isophthalic acid, phthalic acid and one of their diester or anhydride derivatives, and
at least one aliphatic diacid (iii) or one of its diester or anhydride derivatives.

The aliphatic diol (i) can be linear or branched and is chosen from the group consisting of ethylene glycol (CAS: 107-21-1), diethylene glycol, triethylene glycol, tetraethylene glycol, 1,2-propanediol, dipropylene glycol, tripropylene glycol, tetrapropylene glycol, 1,6-hexanediol, 3-ethyl-2-methyl-1,5-pentanediol, 2-ethyl-3-propyl-1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl-3-ethyl-2-propyl-1,5-pentanediol, 2,3-dipropyl-4-ethyl-2-methyl-1,5-pentanediol, 2-butyl-2-ethyl-1,5-pentanediol, 2-butyl-2,3-diethyl-4-methyl-1,5-pentanediol, 2-butyl-2,4-diethyl-3-propyl-1,5-pentanediol, 3-butyl-2-propyl-1,5-pentanediol, 2-methyl-1,5-pentanediol (CAS: 42856-62-2), 3-methyl-1,5-pentanediol (MPD, CAS: 4457-71-0), 2,2-dimethyl-1,3-pentanediol (CAS: 2157-31-5), 2,2-dimethyl-1,5-pentanediol (CAS: 3121-82-2), 3,3-dimethyl-1,5-pentanediol (CAS: 53120-74-4), 2,3-dimethyl-1,5-pentanediol (CAS: 81554-20-3), 2,2-dimethyl-1,3-propanediol (neopentyl glycol-NPG, CAS: 126-30-7), 2,2-diethyl-1,3-propanediol (CAS: 115-76-4), 2-methyl-2-propyl-1,3-propanediol (CAS: 78-26-2), 2-butyl-2-ethyl-1,3-propanediol (CAS: 115-84-4), 2-methyl-1,3-propanediol (CAS: 2163-42-0), 2-benzyloxy-1,3-propanediol (CAS: 14690-00-7), 2,2-dibenzyl-1,3-propanediol (CAS: 31952-16-6), 2,2-dibutyl-1,3-propanediol (CAS: 24765-57-9), 2,2-diisobutyl-1,3-propanediol, 2,4-diethyl-1,5-pentanediol, 2-ethyl-1,6-hexanediol (CAS: 15208-19-2), 2,5-dimethyl-1,6-hexanediol (CAS: 49623-11-2), 5-methyl-2-(1-methylethyl)-1,3-hexanediol (CAS: 80220-07-1), 1,4-dimethyl-1,4-butanediol, 1,5-hexanediol (CAS: 928-40-5), 3-methyl-1,6-hexanediol (CAS: 4089-71-8), 3-(tert-butyl)-1,6-hexanediol (CAS: 82111-97-5), 1,3-heptanediol (CAS: 23433-04-7), 1,2-octanediol (CAS: 1117-86-8), 1,3-octanediol (CAS: 23433-05-8), 2,2,7,7-tetramethyl-1,8-octanediol (CAS: 27143-31-3), 2-methyl-1,8-octanediol (CAS: 109359-36-6), 2,6-dimethyl-1,8-octanediol (CAS: 75656-41-6), 1,7-octanediol (CAS: 3207-95-2), 4,4,5,5-tetramethyl-3,6-dioxa-1,8-octanediol (CAS: 76779-60-7), 2,2,8,8-tetramethyl-1,9-nonanediol (CAS: 85018-58-2), 1,2-nonanediol (CAS: 42789-13-9), 2,8-dimethyl-1,9-nonanediol (CAS: 40326-00-9), 1,5-nonanediol (CAS: 13686-96-9), 2,9-dimethyl-2,9-dipropyl-1,10-decanediol (CAS: 85018-64-0), 2,9-dibutyl-2,9-dimethyl-1,10-decanediol (CAS: 85018-65-1), 2,9-dimethyl-2,9-dipropyl-1,10-decanediol (CAS: 85018-64-0), 2,9-diethyl-2,9-dimethyl-1,10-decanediol (CAS: 85018-63-9), 2,2,9,9-tetramethyl-1,10-decanediol (CAS: 35449-36-6), 2-nonyl-1,10-decanediol (CAS: 48074-20-0), 1,9-decanediol (CAS: 128705-94-2), 2,2,6,6,10,10-hexamethyl-4,8-dioxa-1,11-undecanediol (CAS: 112548-49-9), 1-phenyl-1,11-undecanediol (CAS: 109217-58-5), 2-octyl-1,11-undecanediol (CAS: 48074-21-1), 2,10-diethyl-2,10-dimethyl-1,11-undecanediol (CAS: 85018-66-2), 2,2,10,10-tetramethyl-1,11-undecanediol (CAS: 35449-37-7), 1-phenyl-1,11-undecanediol (CAS: 109217-58-5), 1,2-undecanediol (CAS: 13006-29-6), 1,2-dodecanediol (CAS: 1119-87-5), 2,11-dodecanediol (CAS: 33666-71-6), 2,11-diethyl-2,11-dimethyl-1,12-dodecanediol (CAS: 85018-68-4), 2,11-dimethyl-2,11-dipropyl-1,12-dodecanediol (CAS: 85018-69-5), 2,11-dibutyl-2,11-dimethyl-1,12-dodecanediol (CAS: 85018-70-8), 2,2,11,11-tetramethyl-1,12-dodecanediol (CAS: 5658-47-9), 1,11-dodecanediol (CAS: 80158-99-2), 11-methyl-1,7-dodecanediol (CAS: 62870-49-9), 1,4-dodecanediol (CAS:

38146-95-1), 1,3-dodecanediol (CAS: 39516-24-0), 1,10-dodecanediol (CAS: 39516-27-3), 2,11-dimethyl-2,11-dodecanediol (CAS: 22092-59-7), 1,5-dodecanediol (CAS: 20999-41-1), 6,7-dodecanediol (CAS: 91635-53-9), and cyclohexanedimethanol.

Preferably, the diol (i) is chosen from ethylene glycol, diethylene glycol, trimethylene glycol, hexamethylene glycol, propylene glycol (or propane-1,2-diol), propane-1,3-diol, (1,4-, 1,3- or 1,2-)butanediol, neopentyl glycol, 2-methyl-1,3-propanediol, hexanediol or also cyclohexanedimethanol.

According to a preferred alternative form, the diol (i) is chosen from ethylene glycol and diethylene glycol.

More preferably still, two diols (i) consisting respectively of ethylene glycol and diethylene glycol are used.

Mention may be made, among the diester derivatives of terephthalic acid, of isophthalic acid or of phthalic acid which can be used as monomers (ii), for example, of dimethyl terephthalate or dimethyl isophthalate. Mention may be made, as example of anhydride derivative of an aromatic diacid for the monomer (ii), of phthalic anhydride.

Preferably, two diacids (ii) consisting respectively of terephthalic acid and isophthalic acid are used.

The aliphatic diacid (iii) can be linear or branched and is, for example, chosen from adipic acid, azelaic acid, sebacic acid, cyclohexanedicarboxylic acid, dodecanedicarboxylic acid, 1,10-decanedicarboxylic acid and succinic acid.

Preferably, adipic acid is used as aliphatic diacid (iii).

A person skilled in the art can determine the nature of the comonomers (i), (ii) and (iii) and their relative amounts so as to obtain a copolyester diol (A1), the number-average molecular weight $M_n$ of which is in the range indicated above and which is moreover amorphous, that is to say the analysis of which by differential scanning calorimetry (DSC) shows that it does not exhibit a melting point.

According to a preferred embodiment, the number-average molecular weight $M_n$ of the copolyester diol (A1) is in a range extending from 8980 to 11 810 g/mol, corresponding to an NOH ranging from 9.5 to 12.5 mg KOH/g.

According to a preferred embodiment, the copolyester diol (A1) is obtained by polycondensation:
- of two aliphatic diols (i) consisting, respectively, of ethylene glycol and diethylene glycol; with
- two diacids (ii) consisting, respectively, of terephthalic acid and isophthalic acid; and
- adipic acid as aliphatic diacid (iii).

When some among the monomers (ii) and optionally (iii) are diester derivatives, for instance methyl or ethyl diester derivatives, said monomers are, in a $1^{st}$ stage, mixed with one or more diol monomers (i), said mixture being brought to a temperature that can range up to 190° C., so as to carry out a transesterification reaction, preferably in the presence of a titanium-based or zinc-based catalyst, and to eliminate the methanol or the ethanol formed. In a $2^{nd}$ stage, the monomers (ii) and optionally (iii) which are diacids are added, as a mixture with one or more diol monomers (i), the reaction medium being brought to a temperature that can range up to 230° C., so as to carry out the esterification reaction and to eliminate the water formed. Finally, in a $3^{rd}$ stage, the pressure is lowered to a value of less than approximately 5 mbar and the reaction medium is brought to a higher temperature, up to a value in the vicinity of 250° C., in order to increase the length of the chains of the copolyesters in order to achieve an NOH within the range indicated above.

Amorphous Polyurethane Diol (A2):

According to one embodiment, the amorphous prepolymer included in the composition (A) is the amorphous polyurethane diol (A2).

The amorphous polyurethane diol (A2) can be linear or branched and has a number-average molecular weight $M_n$ ranging from 8000 to 12 000 g/mol. It is obtained by a polyaddition reaction between an aliphatic diisocyanate compound (A2.P1) and a stoichiometric excess of a linear or branched amorphous copolyester diol (A2.P2), the number-average molecular weight $M_n$ of which ranges from 4000 to 11 500 g/mol and which is obtained by the polycondensation reaction as defined above for (A1).

The aliphatic diisocyanate compound (A2.P1) is advantageously chosen from isophorone diisocyanate (IPDI), meta-xylylene diisocyanate (m-XDI), hydrogenated meta-xylylene diisocyanate (m-H6XDI), pentamethylene diisocyanate (PDI) and hexamethylene diisocyanate (HDI). These various diisocyanates are widely available commercially. meta-Xylylene diisocyanate (m-XDI) is, for example, available under the name Takenate® 500 from Mitsui Chemicals. Hydrogenated meta-xylylene diisocyanate (m-H6XDI), also named bis(isocyanatomethyl)cyclohexane, is, for example, available under the name Takenate® 600 from Mitsui Chemicals.

According to a preferred alternative form, the aliphatic diisocyanate compound (A2.P1) is isophorone diisocyanate (IPDI).

In the present text, the term "aliphatic diisocyanate compound" is understood to mean a hydrocarbon compound of low molar mass (less than 300 g/mol) having two isocyanate groups, which compound is either non-aromatic or such that none of the NCO groups is connected by a covalent bond to a carbon atom forming part of an aromatic hydrocarbon ring, such as a phenyl group. Within the meaning of this definition, m-XDI, of formula:

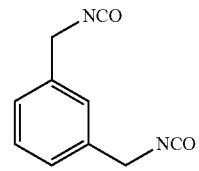

is thus an aliphatic diisocyanate.

Thus, in the present text, the term "aromatic diisocyanate compound" is understood to mean a hydrocarbon compound of low molar mass (less than 300 g/mol) having two isocyanate groups, which compound is aromatic and such that all the NCO groups are connected by a covalent bond to a carbon atom forming part of the aromatic hydrocarbon ring.

The amounts of aliphatic diisocyanate compound (A2.P1) and of linear copolyester diol (A2.P2) employed in the polyaddition reaction are such that the —NCO/—OH molar equivalent ratio is less than or equal to 0.5, preferably less than or equal to 0.4, preferably less than or equal to 0.3, preferably less than or equal to 0.2, preferably less than or equal to 0.1. The term "—NCO/—OH molar equivalent ratio" is understood to mean the ratio of the equivalent number of —NCO groups present in the aliphatic diisocyanate compound (A2.P1) to the equivalent number of —OH groups present in the amorphous copolyester diol (A2.P2).

The polyaddition reaction is generally carried out at a temperature of between 70 and 85° C. for a period of time of a few hours, optionally in the presence of a catalyst.

The amorphous, linear or branched, polyurethane diol obtained on conclusion of this reaction has a number-average molecular weight $M_n$ within a range extending from 8000 to 12 000 g/mol, preferably from 8980 to 11 810 g/mol.

Composition (B) (—NCO Component):

The composition (B) comprises a compound (B1) including three —NCO end groups which is obtained by the reaction of meta-xylylene diisocyanate (m-XDI) with a triol, said compound (B1) being:

either the only compound comprised in (B) including three —NCO end groups;

or else a mixture with another compound (B2) including three —NCO end groups, (B2) being derived from an aliphatic diisocyanate and the content of (B1) in said mixture being at least 40% by weight, based on the total weight of said mixture.

Preferably, said compound (B2) is other than the product of the reaction of m-XDI with a triol.

According to a $1^{st}$ embodiment, the composition (B) comprises the compound (B1) as sole trifunctional compound.

Said compound (B1), also described as adduct of m-XDI and of triol, is obtained by an addition reaction employing said compounds. The methods for such an addition reaction are, for example, described in the patent application EP 3 101 044 of Mitsui Chemicals.

The triol used is preferably a trimethylolalkane comprising an alkane comprising from 1 to 20 carbon atoms and 3 methylol groups, such as, for example, trimethylolmethane, trimethylolethane, trimethylolpropane, trimethylol(n-butane), trimethylolisobutane, trimethylol(s-butane), trimethylol(t-butane), trimethylolpentane, trimethylolhexane, trimethylolheptane, trimethyloloctane, trimethylolnonane, trimethyloldecane, trimethylolundecane and trimethyloldodecane.

More preferably, mention may be made, among the triols which can be used to obtain the adduct of m-XDI and of triol, of glycerol of formula $HOH_2C$—$CHOH$—$CH_2OH$, trimethylolmethane (TMM) of formula $HC(CH_2$—$OH)_3$, trimethylolethane (TME) of formula $H_3C$—$C(CH_2$—$OH)_3$ and trimethylolpropane (TMP) of formula $CH_3$—$CH_2$—$C(CH_2$—$OH)_3$.

According to a particularly preferred embodiment, the compound (B1) is the adduct of m-XDI and of TMP, of formula:

Adducts of m-XDI and of triol are also available commercially.

Mention may be made, for example, of the adduct of m-XDI and of TMP available, in 75% solution in ethyl acetate, from Mitsui Chemicals under the name Takenate® D-110N. The adduct of m-H6XDI and of TMP is also available, in 75% solution in ethyl acetate, from Mitsui Chemicals under the name Takenate® D-120N.

According to a $2^{nd}$ embodiment, the composition (B) comprises a mixture of the compound (B1) and of another compound (B2) including three —NCO end groups, which is a derivative of an aliphatic diisocyanate.

According to a preferred alternative form, said aliphatic diisocyanate is chosen from isophorone diisocyanate (IPDI), hexamethylene diisocyanate (HDI), pentamethylene diisocyanate (PDI), meta-xylylene diisocyanate (m-XDI) or hydrogenated meta-xylylene diisocyanate (m-H6XDI).

According to another preferred alternative form of the $2^{nd}$ embodiment, said derivative (B2) is chosen from:

the isocyanurate (B2-1) of said aliphatic diisocyanate; and the adduct (B2-2) of said aliphatic diisocyanate and of a triol.

The isocyanurate (B2-1) can also be denoted as the cyclic trimer of said aliphatic diisocyanate. It is thus advantageously chosen from the compounds of the following list:

IPDI isocyanurate, of formula:

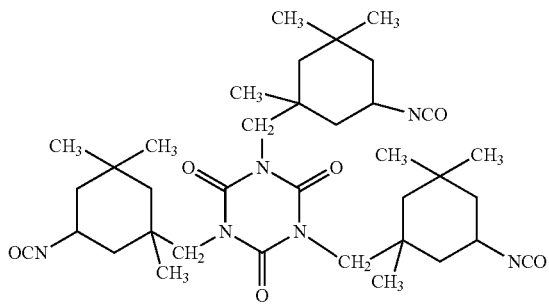

HDI isocyanurate, of formula:

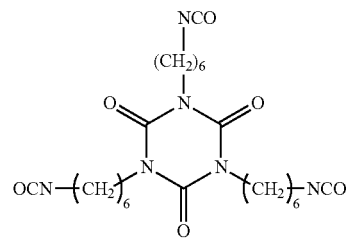

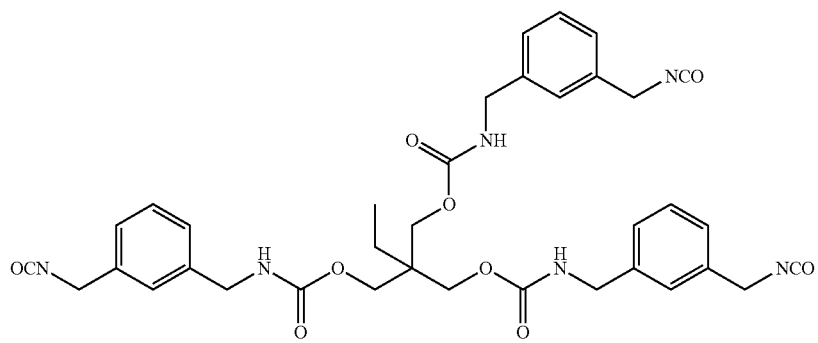

PDI isocyanurate, of formula:

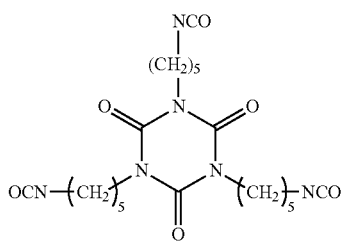

m-XDI isocyanurate of formula:

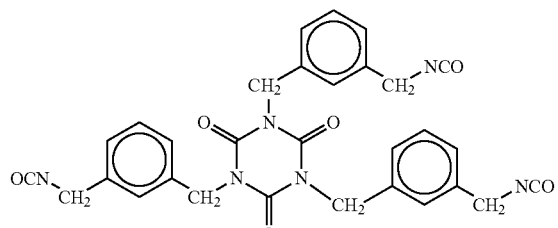

m-H6XDI isocyanurate of formula:

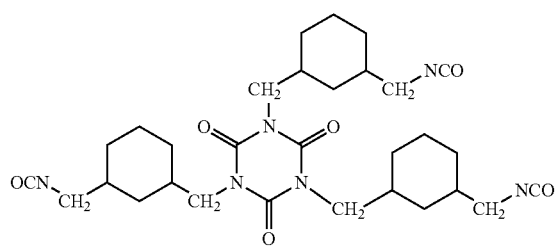

These isocyanurates are generally obtained by a trimerization reaction of the corresponding diisocyanates, as described, for example, in the patent applications EP 0 047 452 or U.S. Pat. No. 8,097,691 of Bayer.

Certain isocyanurates are also available industrially, such as, for example, IPDI isocyanurate (or IPDI cyclic trimer) from Evonik, under the name Vestanat® T1890/100, which is a solvent-free product.

The adduct (B2-2) of the aliphatic diisocyanate and of a triol mentioned above can be obtained from a triol which is as defined above for (B1).

An adduct (B2-2) obtained with trimethylolpropane (TMP) is preferred.

The adduct (B2-2) consisting of the adduct of IPDI and of TMP is particularly advantageous (CAS Number: 68975-82-6).

This last adduct corresponds to the formula:

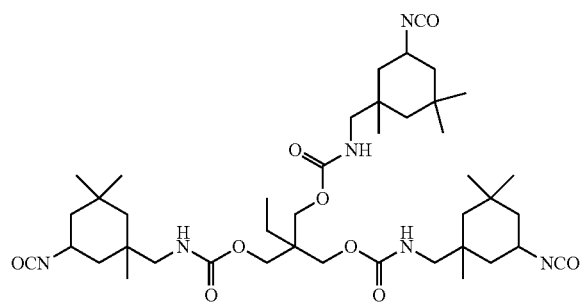

It is available industrially from Alfa Chemistry under the name: 2-ethyl-2-[[[[[(5-isocyanato-1,3,3-trimethylcyclohexyl)methyl]amino]carbonyl]oxy]methyl]propylene [(5-isocyanato-1,3,3-trimethylcyclohexyl)methyl]carbamate (reference ACM68975826).

These adducts are generally obtained by a reaction of addition of the corresponding diisocyanates to triols according to the procedure described in the patent application EP 3 101 044 of Mitsui Chemicals.

According to a more preferred alternative form, the aliphatic diisocyanate from which compound (B2) is derived is isophorone diisocyanate (IPDI).

According to an even more preferred alternative form of this $2^{nd}$ embodiment, the composition (B) comprises a mixture of:
the adduct (B1) of m-XDI and of trimethylolpropane (TMP); and of
IPDI isocyanurate as compound (B2).

When, in accordance with the $2^{nd}$ embodiment of the invention, the composition (B) comprises a mixture of the compound (B1) and of another compound (B2) comprising three —NCO end groups, the content of (B1) in the mixture (B1)+(B2) is at least 40% weight/weight. Said content is expressed as weight of (B1) on the basis of the total weight of said mixture and is denoted below by the wording: ratio by weight (B1)/[(B1)+(B2)].

The ratio by weight (B1)/[(B1)+(B2)] is preferably at least 50% weight/weight and more preferentially still 60% weight/weight, a minimum limit of 65% weight/weight being particularly advantageous.

According to a very particularly preferred alternative form, the ratio by weight (B1)/[(B1)+(B2)] is within a range extending from 40% to 80% weight/weight, preferably from 50% to 80%, and more preferentially still from 60% to 80%. The resistance to sterilization of a PET/ALU/OPA/cPP four-layer is then particularly improved.

Two-Component Adhesive Composition:

Said adhesive composition preferably comprises an adhesion promoter chosen from an aminosilane or a ureidosilane, preferably an aminosilane, which can be comprised in the —NCO component or in the —OH component, preferably in the —OH component.

Said promoter is, for example, advantageously chosen from those listed in the table below, which are available from Momentive:

| Trade name | Chemical name | CAS No. |
| --- | --- | --- |
| Silquest ® A-1100 | Aminopropyltriethoxysilane | 919-30-2 |
| Silquest ® A-1110 | Aminopropyltrimethoxysilane | 13822-56-5 |
| Silquest ® A-1170 | Bis(3-trimethoxysilyl)propylamine | 82985-35-1 |
| Silquest ® A-1120 | Aminoethylaminopropyltrimethoxysilane | 1760-24-6 |
| Silquest ® A-1130 | Diethylenetriaminopropyltrimethoxysilane | 35141-30-1 |
| Silquest ® A-1524 | gamma-ureidopropyltrimethoxysilane | 35141-30-1 |

An aminosilane is preferred as an adhesion promoter.

The content of said adhesion promoter can vary from 0.5% to 5% by weight, on the basis of the total weight of the composition (A) or (B).

According to a more preferred alternative form, the adhesion promoter is aminopropyltrimethoxysilane.

The composition (A) (—OH component) comprises the amorphous, linear or branched, prepolymer chosen from (A1) and (A2) in solution in an organic solvent.

The latter can be an ester, such as ethyl acetate and butyl acetate, a ketone, such as methyl ethyl ketone and methyl isobutyl ketone, and an aromatic compound, such as toluene and xylene.

The amount of solvent is adjusted by dilution so as to obtain a specialty intended for laminators which is as concentrated as possible, a solids content of between 55% and 65% as weight/weight being generally encountered in practice.

The composition (B) (—NCO component) comprises the compound (B1) and optionally (B2) also in solution in an organic solvent, the nature and the amount of which are as defined for the composition (A).

The compositions (A) and (B) are prepared by simple mixing of their ingredients at ambient temperature, if necessary with stirring.

The viscosity measured at 23° C. of each of the two —NCO and —OH components is advantageously less than or equal to 10 Pa·s, preferably less than or equal to 5 Pa·s. Said viscosity is also measured using a Brookfield viscometer according to the standard ISO 2555, published in 1999. Each of the two components, which are in practice stored separately in containers of suitable capacity (for example 200 l drums), can thus be conveniently introduced into the laminating machine by means of a pump.

The amounts of the —NCO and —OH components of the two-component adhesive composition according to the invention are such that the —NCO/—OH molar equivalent ratio is within a range extending from 3 to 5, preferably from 3.5 to 4.5. The term "—NCO/—OH molar equivalent ratio" is understood to mean
the ratio of the equivalent number of —NCO groups (present in the —NCO component) to the equivalent number of —OH groups (present in the —OH component).

The mixing of the —NCO and —OH components, in the ratio indicated, is carried out at ambient temperature by the operator of the laminating machine, before it is started up. The viscosity of the adhesive composition thus obtained can be adjusted by simple addition of solvent, resulting in a final amount of solids of the adhesive composition which can vary in practice from 30% to 40% weight/weight. The adhesive composition thus obtained is entirely suitable for its employment in a laminating machine and for correct operation of the latter.

The two-component adhesive composition according to the invention can additionally comprise additives which can be comprised in the —NCO component and/or in the —OH component, such as rheological additives, catalysts or also plasticizers. The total content of these optional additives, in each of the —NCO and/or —OH components, can range up to 2% by weight, on the basis of the total weight of the component under consideration.

Thus, and according to a preferred alternative form, the two-component adhesive composition according to the invention is such that the composition (A) consists of an organic solution:
of the amorphous prepolymer chosen from (A1) and (A2), and
optionally of an adhesion promoter present in a proportion of 0.5% to 5% by weight, on the basis of the total weight of the composition (A), and
optionally of optional additives present in a proportion of up to 2% by weight, on the basis of the total weight of the composition (A).

According to another preferred alternative form, the two-component adhesive composition according to the invention is such that the composition (B) consists of an organic solution:
of the compound (B1), alone or as a mixture with the compound (B2), and
optionally of an adhesion promoter present in a proportion of 0.5% to 5% by weight, on the basis of the total weight of the composition (B), and
optionally of optional additives present in a proportion of up to 2% by weight, on the basis of the total weight of the composition (B).

According to a more preferred alternative form, the optional additives present in the composition (A) and/or the composition (B) are chosen from rheological additives, catalysts or also plasticizers.

Multilayer Film:

The invention also relates to a multilayer film comprising two thin layers of material bonded together by a continuous layer, characterized in that said layer is constituted by the two-component adhesive composition according to the invention in the crosslinked state, in a proportion of an amount of less than 7 g/m$^2$.

According to an alternative form of the invention, said amount is within a range extending from 0.5 to 5 g/m$^2$ and preferably extending from 1 to 4 g/m$^2$.

The materials from which the thin layers surrounding the adhesive layer are made are generally chosen from paper, a metal, such as, for example, aluminum, or thermoplastic polymers, such as:
polyethylene (PE),
polypropylene (PP), and in particular cast polypropylene, abbreviated to cPP,
a copolymer based on ethylene and on propylene,
polyamide (PA), and in particular biaxially oriented polyamide (or OPA or BOPA),
polyethylene terephthalate (PET), or also
a copolymer based on ethylene, such as, for example, a maleic anhydride-grafted copolymer, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
polystyrene (PS),
polyvinyl chloride (PVC),
polyvinylidene fluoride (PVDF),
a polymer or copolymer of lactic acid (PLA), or
a polyhydroxyalkanoate (PHA).

The materials preferentially chosen to constitute the thin layers surrounding the adhesive layer are aluminum, PE, PP, PET and PA.

Mention may also be made of a thin layer consisting of a thermoplastic polymer, preferentially of PE, PP or PET, covered with a layer of less than 1 μm of aluminum, alumina or silica SiO$_x$. A thin layer coated with such a layer is, for example, denoted PET$_{SiOx}$.

The thickness of the two thin layers adjacent to the adhesive layer and of the other layers employed in the multilayer film according to the invention is capable of varying within a wide range extending from 5 to 150 μm, preferably from 7 to 80 μm. The total thickness of said film is capable of also varying within a wide range extending from 20 to 400 μm.

According to a preferred alternative form, the film comprises from two to four thin layers of materials, said film then being respectively denoted two-layer, three-layer or four-layer.

According to one embodiment, said film is chosen from:
a two-layer film: BOPA/cPP;
a three-layer film: PET/ALU/cPP or PET$_{SiOx}$/BOPA/cPP; or also
a four-layer film: PET/ALU/BOPA/cPP.

In the case of a three-layer or four-layer film or more generally of a multilayer film comprising several thin layers of material (or individual films), each pair of adjacent thin layers of material is bonded by a layer of adhesive composition.

The invention also relates to a process for the continuous preparation of the multilayer film as defined above, comprising the sequential stages of:
(i) combining the —NCO and —OH components and, if appropriate, diluting with a solvent, in order to form an adhesive mixture;
(ii) coating, with said adhesive mixture, a first thin layer of material in the form of a substantially continuous layer;
(iii) evaporating the organic solvent;
(iv) laminating a second thin layer over the first thin layer coated in accordance with stage (ii), then
(v) crosslinking the adhesive mixture.

When the multilayer film is a three-layer film A/B/C:
in a $1^{st}$ stage, the two-layer A/B is prepared in accordance with said process, then
stages (i), (ii), (iii) and (iv) are repeated using, as $1^{st}$ thin layer of material, said two-layer A/B and, as $2^{nd}$ thin layer, the film C.

Such a three-layer film A/B/C can be obtained, according to a first alternative form, by recovering the reel of two-layer film A/B obtained at the end of the $1^{st}$ stage and by using it to feed the laminating machine in combination with the reel of film C. According to a second alternative form, the coating of the layer A, the laminating of the layer B, then the coating of the two-layer A/B and the laminating of the layer C are carried out directly in-line, by a laminating machine suitable for such an in-line formation of a three-layer film.

Finally, the invention relates to the use of the multilayer film according to the invention for the manufacture of flexible packagings. This is because the multilayer films according to the invention can be used for the manufacture of the most varied flexible packagings, which are formed and then closed (after the stage of putting the product intended for the consumer in a proper state) by heat-sealing (or heat-welding) techniques.

According to a preferred alternative form, the multilayer films according to the invention are used for the manufacture of flexible packagings intended for sterilization treatments, such as the sterilization of processed foodstuffs put in a proper state in said flexible packagings.

The invention is now described in the following implementational examples, which are given purely by way of illustration and should not be interpreted in order to limit the scope thereof.

EXAMPLE 1 (REFERENCE): —OH COMPONENT—PREPARATION OF A COMPOSITION (A) COMPRISING AN AMORPHOUS COPOLYESTER DIOL (A1) AND AMINOPROPYLTRIMETHOXYSILANE

First of all, an amorphous linear copolyester diol (A1) is prepared according to the procedure indicated below.

35.120 g of monoethylene glycol and 154.435 g of diethylene glycol are introduced into a closed 1 liter reactor which is equipped with a stirrer, a distillation column, heating means and a thermometer and which is connected to a vacuum pump.

When the temperature of the reaction mixture reaches 120° C., the following are introduced into the reactor: 76.190 g of adipic acid, 170.035 g of isophthalic acid, 64.165 g of terephthalic acid and 0.035 g of a catalyst based on a titanium chelate (Tyzor® LA from DuPont).

Subsequently, a temperature gradient is programmed in order to reach a temperature of 230° C. in 3 h. The acid number ($N_a$) is subsequently measured. The reaction is halted when the acid number $N_a$ is less than 25 mg KOH/g.

0.020 g of a titanium-based catalyst (of formula $(nBuO)_4$ Ti, Tyzor® TnBT from DuPont) is then introduced, then the reactor is placed under vacuum (reach of 15 mbar in 2 h) and the reaction mixture is heated to 240° C.

Measurements are taken of the $N_a$ and of the Brookfield viscosity at 180° C. The reaction is halted when the $N_a$ is less than 3 mg KOH/g and when the viscosity is between 8000 and 9000 mPa·s.

The copolyester diol obtained is subsequently cooled to 200° C. and is then slowly poured into ethyl acetate at ambient temperature with stirring, to form a 59.47% weight/weight solution.

The NOH of the copolyester diol thus obtained was measured according to the standard ISO 14900:2017 and is equal to 10 mg KOH/g, corresponding to an $M_n$ of 11 220 g/mol.

Silquest® A1110 is added to said solution, as adhesion promoter, after cooling to 45° C. and at a content of 0.89% weight/weight.

The content by weight of —OH functional groups of the —OH component is 0.18% weight/weight.

The Brookfield viscosity at 23° C. of the —OH component is 5 Pa·s.

EXAMPLE 2 (REFERENCE): —NCO COMPONENT—PREPARATION OF A SOLUTION (B) IN ETHYL ACETATE OF THE ADDUCT (B1) OF M-XDI AND OF TRIMETHYLOLPROPANE (TMP)

Use is made, for the adduct (B1) of m-XDI and of TMP, of the product Takenate® D-110N sold by Mitsui Chemicals, which is a 75% weight/weight solution of said adduct in ethyl acetate and the content of —NCO functional group of which, expressed as % weight/weight, is 11.5%.

Said product Takenate® D-110N is simply introduced at ambient temperature into a glass reactor kept stirred and under nitrogen; the content of ingredient (B1) of the solution (B) is shown in table 1, expressed as % weight/weight.

The Brookfield viscosity at 23° C. is measured and the value obtained is shown in table 1.

The content by weight as % weight/weight of —NCO functional group is also shown in table 1.

EXAMPLE 3 (REFERENCE): —NCO COMPONENT—PREPARATION OF A SOLUTION (B) IN ETHYL ACETATE OF THE ADDUCT (B1) OF M-XDI AND OF TMP, AND OF IPDI ISOCYANURATE (B2)

Use is made, for the IPDI isocyanurate, of the product Vestanat® T1890/100 sold by Evonik, which is solvent-free and the content of which, expressed as % weight/weight of —NCO functional group, is 17.3%.

The adduct (B1) of m-XDI and of TMP is still Takenate® D-110N.

The IPDI isocyanurate (B2) is dissolved, in ethyl acetate preheated to 50° C., in a glass reactor maintained under constant stirring and under nitrogen. After it has completely dissolved, the adduct (B1) of m-XDI and of TMP is introduced into the mixture at the same temperature.

The mixture is maintained at 70° C. and homogenized for 30 minutes.

A solution is obtained, the contents of ingredients of which are shown in table 1.

The Brookfield viscosity at 23° C. is measured and the value obtained is shown in table 1.

The content by weight as % weight/weight of —NCO functional group is measured according to the standard NF T52-132 and given in table 1.

The ratio by weight (B1)/[(B1)+(B2)] is also shown in table 1.

EXAMPLES 4 TO 5 (REFERENCE) AND 6 (COMPARATIVE): —NCO COMPONENT— PREPARATION OF SOLUTIONS (B) IN ETHYL ACETATE OF THE ADDUCT (B1) OF M-XDI AND OF TMP, AND OF IPDI ISOCYANURATE (B2)

Example 3 is repeated for different contents of (B1) and (B2).

The Brookfield viscosity at 23° C., the ratio by weight (B1)/[(B1)+(B2)] and the content by weight as % weight/weight of —NCO functional group are also given in table 1.

EXAMPLE 1/2 (ACCORDING TO THE INVENTION): TWO-COMPONENT ADHESIVE COMPOSITION OBTAINED BY MIXING THE —OH COMPONENT OF EXAMPLE 1 AND THE —NCO COMPONENT OF EXAMPLE 2

The —OH component of example 1 is mixed with the —NCO component of example 2 in a proportion of an —NCO/—OH molar equivalent ratio equal to 4.13, which corresponds to an —NCO component/—OH component ratio by weight equal to 100 g of —OH component per 16 g of —NCO component.

The mixing is carried out at ambient temperature in the feed tank of the laminating machine, via a mixing unit and a static mixer.

The constituent data of the two-component adhesive composition are given in table 2.

EXAMPLES 1/3, 1/4 AND 1/5 (ACCORDING TO THE INVENTION) AND 1/6 (COMPARATIVE): TWO-COMPONENT ADHESIVE COMPOSITIONS

The preceding example 1/2 is repeated, the —NCO component of example 2 being replaced with the —NCO component of examples 3, 4, 5 and 6 respectively.

The values of the —NCO/—OH molar equivalent ratio and of the —NCO component/—OH component ratio by weight are also given in table 2.

EXAMPLE 7 (ACCORDING TO THE INVENTION): TWO-LAYER FILM BOPA/CPP

A two-layer film consisting of a film of BOPA and of a film of cPP bonded by a layer of adhesive composition is prepared.

A film of biaxially oriented polyamide with a thickness of 15 µm and a film of cast polypropylene with a thickness of 60 µm is used.

This two-layer film is obtained by feeding the tank of a laminating machine of Nordmeccanica type with the two-component adhesive composition, for each of examples 1/2 to 1/6.

Said laminating machine is provided with a coating device of roller type with an open tank, operating at ambient temperature and at a running speed of 50 m/minute; the adhesive layer binding the films of BOPA and of cPP exhibits a thickness of approximately 3.5 µm, corresponding to approximately 3.5 g/m² of adhesive composition.

This two-layer film is subjected to the following tests.

A. Determination of the Crosslinking Time:

A.1. Principle of the Test:

The aim of this test is to measure the period of time (expressed in days) necessary for the crosslinking of the constituent two-component adhesive of the adhesive layer of the two-layer film, starting from the manufacture of said film by lamination.

This period of time is evaluated by the number of days necessary for the film to be sufficiently cohesive and more specifically for the cohesion of said film, measured by the 1800 peel test (described below), to be greater than a reference value equal to 3 N/15 mm.

A.2. Sampling of the Film:

Immediately after it has been manufactured, the two-layer film is stored at a temperature of 23° C. and under an atmosphere having 50% relative humidity (RH).

A sample is taken each day from the two-layer film thus stored and is subjected to the 1800 peel test.

A.3. Description of the 1800 Peel Test:

The 180° peel test is as described in the French standard NF T 54-122. The principle of this test consists of the determination of the force necessary for the separation (or peeling) of two individual layers of films, which layers are bonded by the two-component adhesive.

A test specimen of rectangular shape, with a width of 15 mm and a length of approximately 10 cm, is cut out from the two-layer film. The two individual layers of film comprised in this strip are manually detached from the end of this test specimen, and over approximately 2 cm, and the two free ends thus obtained are attached to two fastening devices respectively connected to a stationary part and a movable part of a tensile testing device which are located on a vertical axis.

While a drive mechanism imparts a uniform rate of 100 mm/minute to the movable part, resulting in the detachment of the two layers, the detached ends of which gradually move along a vertical axis with the formation of an angle of 180°, the stationary part—connected to a dynamometer— measures the force which is withstood by the test specimen thus held and which is expressed in N/15 mm.

A.4. Result:

The crosslinking time is shown in days, for each of the two-component adhesive compositions 1/2 to 1/6, in table 2.

B. Determination of the Initial Tack:

The initial tack is evaluated by measuring the cohesion of the two-layer film immediately after its manufacture, by means of the 1800 peel test described above in § A.3.

The result is shown in N/15 mm in table 2, for each of the two-component adhesive compositions 1/2 to 1/6.

The values obtained are greater than 2 N/15 mm and thus correspond to an entirely satisfactory initial tack.

EXAMPLE 8 (ACCORDING TO THE INVENTION): THREE-LAYER FILM PET/ALU/CPP

A three-layer film consisting of a first film made of PET, of a second film made of aluminum and of a third film made of cPP, which are bonded at each interface by a layer of adhesive composition, is prepared.

Use is made of a film of polyethylene terephthalate with a thickness of 12 μm, a film of aluminum with a thickness of 7 μm and a film of cast polypropylene with a thickness of 60 μm.

This three-layer film is obtained according to a sequential process by feeding the tank of a laminating machine of Nordmeccanica type with the two-component adhesive composition, for each of examples 1/2 to 1/6.

Said laminating machine is provided with a coating device of roller type with an open tank, operating at ambient temperature and at a running speed of 50 m/minute. The adhesive layer bonding the three films at each PET/ALU and ALU/cPP interface exhibits a thickness of approximately 3.5 μm, corresponding to approximately 3.5 g/m² of adhesive composition.

This three-layer film is subjected to the test of resistance to sterilization described below.

Resistance to Sterilization:

The three-layer film, after it has been manufactured, is placed for 7 days in a climate-controlled chamber maintained at a temperature of 40° C.

A sample of rectangular shape and of A4 format (dimensions 21×29.7 cm) is then taken, which sample is folded in two lengthwise, while exerting a manual pressure on the fold.

This sample is placed in an autoclave at 135° C. in the vapor phase for one hour in order to simulate a sterilization treatment.

The sample is subsequently kept at ambient temperature for 1 hour and the cohesion of the PET/ALU interface of the film is subsequently measured, by means of the 1800 peel test described above in § A.3.

The result is shown in N/15 mm in table 2, for each of the two-component adhesive compositions 1/2 to 1/6.

These operations are repeated on another sample of the film in order to determine the cohesion of the ALU/cPP interface.

The values obtained are all greater than 3 N/15 mm, thus corresponding to an entirely satisfactory resistance to sterilization of the three-layer.

EXAMPLE 9 (ACCORDING TO THE INVENTION): THREE-LAYER FILM PET$_{SIOx}$/BOPA/CPP

Example 8 is repeated using a film of PET with a thickness of 12 μm coated with a coating of silica SiO$_x$ with a thickness of less than 0.1 μm, a film of biaxially oriented polyamide with a thickness of 15 μm and a film of cast polypropylene with a thickness of 60 μm. The PET$_{SiOx}$ film is, for example, available from Amcor under the Ceramis® brand.

The results of the test of resistance to sterilization are given in table 2.

The values obtained at the BOPA/cPP interface are greater than 3 N/15 mm and entirely satisfactory.

The values obtained at the PET$_{SiOx}$/BOPA interface are greater than 2 N/15 mm, which is also regarded as entirely satisfactory, in the case of an interface which comprises a thin layer consisting of a thermoplastic polymer covered with a layer of less than 1 μm of aluminum, of alumina or of silica SiO$_x$.

EXAMPLE 10 (ACCORDING TO THE INVENTION): FOUR-LAYER FILM PET/ALU/BOPA/CPP

A four-layer PET/ALU/BOPA/cPP film is prepared according to a process analogous to that described in examples 8 and 9, using individual films of the same thickness as the films employed in the preceding examples.

The test of resistance to sterilization is also repeated, while adding thereto a check, by visual examination, of the quality of the lamination at the fold formed in the sample of multilayer film.

The results are given in table 3.

The peel values obtained at the three interfaces are greater than 3 N/15 mm and entirely satisfactory.

TABLE 1

Compositions (B) (—NCO component)

| | Ingredient | Ex. 2 (reference) | Ex. 3 (reference) | Ex. 4 (reference) | Ex. 5 (reference) | Ex. 6 (comparative) |
|---|---|---|---|---|---|---|
| (B1) | m-XDI and TMP adduct | 75 | 4.95 | 54.9 | 51.60 | 26.25 |
| (B2) | IPDI isocyanurate | — | 10 | 20 | 23.40 | 49 |
| | Ethyl acetate | 25 | 25.05 | 25.02 | 25 | 24.75 |
| Composition (B) | Brookfield viscosity at 23° C. (mPa · s) | 550 | 1290 | 980 | 1070 | 2700 |
| | Ratio by weight (B1)/[(B1) + (B2)] (as %) | 100 | 87 | 73 | 69 | 35 |
| | Content by weight of —NCO (in %) | 11.50 | 11.69 | 11.60 | 11.00 | 12.50 |

TABLE 2

Two-component adhesive compositions

|  |  | Ex. 1/2 | Ex. 1/3 | Ex. 1/4 | Ex. 1/5 | Ex. 1/6 (comp.) |
|---|---|---|---|---|---|---|
|  | —OH component | Example 1 | Example 1 | Example 1 | Example 1 | Example 1 |
|  | —NCO component | Ex. 2 (ref.) | Ex. 3 (ref.) | Ex. 4 (ref) | Ex. 5 (ref) | Ex. 6 (comp.) |
|  | —NCO/—OH molar equivalent ratio | 4.13 | 4.20 | 3.91 | 3.95 | 4.21 |
|  | —NCO/—OH component ratio by weight | 16/100 | 16/100 | 15/100 | 16/100 | 15/100 |
| Twin-layer BOPA/cPP | Crosslinking time (in days) | 1 | 1 | 1 | 1 | >7 |
|  | Initial tack (N/15 mm) | 5.00 | 4.51 | 2.29 | 2.30 | 3.02 |
|  | Resistance to sterilization |  |  |  |  |  |
| Three-layer PET/ALCU/cPP | Peel PET/ALU interface (N/15 mm) | 3.72 | 4.89 | 3.95 | 4.36 | 4.97 |
|  | Peel ALU/cPP interface (N/15 mm) | 4.21 | 4.82 | 4.55 | 4.49 | 4.85 |
| Three-layer | Peel PET$_{SiOx}$/BOPA interface (N/15 mm) | 3.03 | 2.84 | 2.29 | 2.55 | 3.23 |
|  | Peel BOPA/cPP interface (N/15 mm) | 5.35 | 6.87 | 6.88 | 5.99 | 5.01 |

TABLE 3

|  | Resistance to sterilization | Ex. 1/2 | Ex. 1/3 | Ex. 1/4 | Ex. 1/5 | Ex. 1/6 (comp.) |
|---|---|---|---|---|---|---|
| Four-layer PET/ALU/ BOPA/cPP | Peel PET/ALU interface (N/15 mm) | 5.53 | 4.92 | 3.75 | 4.69 | 6.63 |
|  | Peel ALU/BOPA interface (N/15 mm) | 3.49 | 5.67 | 5.85 | 5.71 | 5.35 |
|  | Peel BOPA/cPP interface (N/15 mm) | 5.87 | 6.15 | 6.20 | 6.58 | 7.73 |
|  | Appearance of the film at the fold | Presence of blisters | Presence of blisters | In accordance | In accordance | In accordance |

The invention claimed is:

1. A solvent-based two-component polyurethane adhesive composition, comprising an —OH component and an —NCO component, such that:
  the —OH component is a composition (A) comprising an amorphous prepolymer which includes two —OH end groups, the number-average molar mass $M_n$ of which ranges from 8000 to 12,000 g/mol and which is chosen from:
    a copolyester (A1) obtained by a polycondensation reaction:
      of at least one aliphatic diol (i); with
      at least one aromatic diacid (ii) chosen from terephthalic acid, isophthalic acid, phthalic acid and one of their diester or anhydride derivatives; and
      at least one aliphatic diacid (iii) or one of its diester or anhydride derivatives; and
    a polyurethane (A2) obtained by a polyaddition reaction between an aliphatic diisocyanate compound (A2.P1) and an amorphous copolyester diol (A2.P2), the number-average molecular weight $M_n$ of which ranges from 4000 to 11 500 g/mol, said copolyester being obtained by the polycondensation reaction as defined above for (A1); and
  the component —NCO is a composition (B) comprising a compound (B1) which includes three —NCO end groups, and which is obtained by the reaction of meta-xylylene diisocyanate (m-XDI) with a triol, said compound (B1) being:
    either the only compound comprised in (B) including three-NCO end groups;
    or else a mixture with another compound (B2) including three-NCO end groups, (B2) being an isocyanurate (B2-1) of an aliphatic diisocyanate and the content of (B1) in said mixture being at least 40% by weight, based on the total weight of said mixture.

2. The adhesive composition as claimed in claim 1, wherein the amorphous prepolymer included in the composition (A) is the amorphous copolyester diol (A1) and the diol (i) is selected from the group consisting of ethylene glycol, diethylene glycol, trimethylene glycol, hexamethylene glycol, propylene glycol, propane-1,3-diol, (1,4-, 1,3- or 1,2-) butanediol, neopentyl glycol, 2-methyl-1,3-propanediol, hexanediol and cyclohexanedimethanol.

3. The adhesive composition as claimed in claim 2, wherein the aliphatic diacid (iii) is selected from the group consisting of adipic acid, azelaic acid, sebacic acid, cyclohexanedicarboxylic acid, dodecanedicarboxylic acid, 1,10-decanedicarboxylic acid and succinic acid.

4. The adhesive composition as claimed in claim 2, wherein the copolyester diol (A1) is obtained by polycondensation:
  of two aliphatic diols (i) consisting respectively of ethylene glycol and diethylene glycol; with
  two diacids (ii) consisting respectively of terephthalic acid and isophthalic acid; and
  adipic acid as aliphatic diacid (iii).

5. The adhesive composition as claimed in claim 1, wherein the compound (B1) is the only compound comprised in the composition (B) including three-NCO end groups.

6. The adhesive composition as claimed in claim 1, wherein the compound (B1) is the adduct of m-XDI and of trimethylolpropane (TMP).

7. The adhesive composition as claimed in claim 1, wherein the compound (B1) is as a mixture with the compound (B2).

8. The adhesive composition as claimed in claim 7, wherein the compound (B2) is an isophorone diisocyanate (IPDI) derivative.

9. The adhesive composition as claimed in claim 7, wherein the composition (B) comprises a mixture of:
   the adduct (B1) of m-XDI and of trimethylolpropane (TMP); and of
   IPDI isocyanurate as compound (B2).

10. The adhesive composition as claimed in claim 7, wherein the content of (B1) in the mixture of (B1) and (B2) is within a range extending from 40% to 80% weight/weight.

11. The adhesive composition as claimed in claim 1, wherein the composition further comprises an adhesion promoter included in the —NCO component or in the —OH component.

12. The adhesive composition as claimed in claim 11, wherein the adhesion promoter is an aminosilane.

13. The adhesive composition as claimed in claim 1, wherein the amounts of the —NCO and —OH components are such that the —NCO/—OH molar equivalent ratio is within a range extending from 3 to 5.

14. A multilayer film comprising two thin layers of material bonded together by a continuous layer, wherein said layer is constituted by the two-component adhesive composition as defined in claim 1 in the crosslinked state, in a proportion of an amount of less than 7 g/m$^2$.

15. A process for the continuous preparation of the multilayer film as defined in claim 14, comprising the sequential stages of:
   (i) combining the —NCO and —OH components and, if appropriate, diluting with a solvent, in order to form an adhesive mixture;
   (ii) coating, with said adhesive mixture, a first thin layer of material in the form of a substantially continuous layer;
   (iii) evaporating the organic solvent;
   (iv) laminating a second thin layer over the first thin layer coated in accordance with stage (ii), then
   (v) crosslinking the adhesive mixture.

* * * * *